US006330597B2

(12) United States Patent
Collin et al.

(10) Patent No.: US 6,330,597 B2
(45) Date of Patent: *Dec. 11, 2001

(54) METHOD AND APPARATUS FOR MONITORING, CONTROLLING, AND CONFIGURING REMOTE COMMUNICATION DEVICES

(75) Inventors: Zeev Collin, Herzliya; Tal Tamir, Givatayim, both of (IL)

(73) Assignee: Conexant Systems, Inc., Newport Beach, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/193,304

(22) Filed: Nov. 17, 1998

Related U.S. Application Data

(63) Continuation-in-part of application No. 09/154,643, filed on Sep. 17, 1998.
(60) Provisional application No. 60/076,784, filed on Mar. 4, 1998.
(51) Int. Cl.[7] .................................................. G06F 15/77
(52) U.S. Cl. .......................... 709/220; 710/8; 710/15; 709/201; 709/202; 709/203; 709/228; 709/229; 709/300
(58) Field of Search ................................ 709/201, 202, 709/203, 228–229, 300–301; 710/15, 8; 714/717, 25; 371/22, 15.1; 379/93.09

(56) References Cited

U.S. PATENT DOCUMENTS

| 4,385,384 | * | 5/1983 | Rosbury et al. | 714/717 |
| 4,516,216 | | 5/1985 | Armstrong | 364/514 |

(List continued on next page.)

FOREIGN PATENT DOCUMENTS

| 19539052A1 | 9/1996 | (DE) . |
| 0 472 386 A2 | 2/1992 | (EP) . |

(List continued on next page.)

OTHER PUBLICATIONS

Brayman et al., "A direct sequence baseband communications system using programmable logic devices", 1998, pp. 144–151, IEEE 98CH36185, ISBN: 0–7803–4449–9.*

(List continued on next page.)

Primary Examiner—Glenton B. Burgess
Assistant Examiner—Hieu C. Le
(74) Attorney, Agent, or Firm—Farjami & Farjami LLP

(57) ABSTRACT

A communication system for monitoring and/or controlling communication parameters of a remote communication device. The communication system monitors a communication channel that is created between the remote communication device and controls the communication device by adjusting internal settings of the communication device that represent communication parameters. The communication device is communicatively coupled to a communication channel to carry out ongoing communications between the communication device and the communication channel. Further, a software module is associated with the communication device, and the software module accesses the internal settings of the communication device from a remote location via the communication channel and performs diagnostics such as monitoring, controlling, and configuring the communication device using the internal settings of the communication device.

52 Claims, 7 Drawing Sheets

U.S. PATENT DOCUMENTS

| | | | |
|---|---|---|---|
| 5,357,519 | * 10/1994 | Martin et al. | 371/15.1 |
| 5,428,784 | 6/1995 | Cahill . | |
| 5,535,242 | 7/1996 | Brigida et al. | 375/222 |
| 5,590,648 | 1/1997 | Mitchell et al. | 128/630 |
| 5,613,100 | 3/1997 | Anezaki | 395/500 |
| 5,630,132 | 5/1997 | Allran et al. | 395/670 |
| 5,634,058 | 5/1997 | Allen et al. | 395/712 |
| 5,649,001 | * 7/1997 | Thomas et al. | 379/93.07 |
| 5,732,261 | 3/1998 | Savitzky et al. | 395/614 |
| 5,752,032 | 5/1998 | Keller et al. | 395/681 |
| 5,774,793 | 6/1998 | Cooper et al. | 455/89 |
| 5,778,226 | 7/1998 | Adams et al. | 391/681 |
| 5,794,009 | 8/1998 | Coleman et al. | 395/500 |
| 5,826,103 | 10/1998 | Whittaker | 710/8 |
| 5,878,120 | * 2/1999 | O'Mahony | 379/93.09 |
| 5,925,114 | 7/1999 | Hoang | 711/48 |
| 5,960,198 | 9/1999 | Roediger et al. | 395/704 |
| 6,023,507 | 2/2000 | Wookey | 380/21 |
| 6,073,179 | * 6/2000 | Liu et al. | 709/224 |

FOREIGN PATENT DOCUMENTS

| | | |
|---|---|---|
| 0720333 A2 | 7/1996 | (EP) . |
| 0 762 655 A2 | 3/1997 | (EP) . |
| 0 778 688 A2 | 6/1997 | (EP) . |
| 59-200557 | 11/1984 | (JP) . |
| 59200557 | 11/1984 | (JP) . |
| 06089239 A | 3/1994 | (JP) . |

OTHER PUBLICATIONS

"Automatic Processing of Meeting Notices" IBM Technical Disclosure Bulletin, vol. 34, No. 9, Feb. 1, 1992, pp. 48–49, XP000300592.

Microsoft Mail Server Product Overview, Dec. 9, 1996, 15: 13: 16, pp. 1–6.

Microsoft Exchange Server, Part One: Overview, pp. 1–19.

Microsoft Exchange Server, Part Two:The Client, pp. 1–20.

Microsoft Exchange Server, Part Three:Scheduling, pp. 1–20.

Marx, "Toward Effective Conversational Messaging", Submitted to the Program in Media Arts and Sciences, School of Architecture and Planning, May 12, 995, pp. 1–123.

G. Epenoy and D. Pilost, "Dynamic Setting of Modem Parameters" *IBM Technical Disclosures Bulletin*, vol. 26, No. 1, Jun. 1983, pp. 261–262.

Epenoy , G. and D. Pilost; Dynamic Setting of Modem Parameters; IBM Technical Disclosure Bulletin, vol. 26, No. 1, Jun. 1983.

IBM TDB, "Asynchronous Task Scheduling", vol. 28, Issue No. 9, pages 4001–4003.

Brayman, et al., "A Direct Sequence Baseband Communications System Using Programmable Logic Devices", 1998, pp 144–151, IEEE 98CH36185, ISBN:0–7803–4449–9.

* cited by examiner

METHOD AND APPARATUS FOR MONITORING, CONTROLLING, AND CONFIGURING REMOTE COMMUNICATION DEVICES

CROSS-REFERENCE TO RELATED APPLICATIONS

The present application claims priority pursuant to 35 U.S.C. §119(e) to U.S. Provisional Application Serial No. 60/076,784, filed Mar. 4, 1998, pending, which is hereby incorporated herein by reference in its entirety. Further, the present application is a continuation-in-part of and claims priority pursuant to 35 U.S.C. §120 to U.S. Non-provisional Patent Application Serial No. 09/154,643, filed Sep. 17, 1998, pending, which is hereby incorporated herein by reference in its entirety. The present application is also related to co-pending U.S. application Ser. Nos. 09/192,627 and 09/193,066, both filed on Nov. 16, 1998.

BACKGROUND

1. Field of the Invention

The present invention relates to communication systems and more particularly to a computer communication system that, among other things, monitors, controls, and diagnoses inefficiencies in communication parameters of the computer communication system while one computer system communicates with another computer system.

2. Description of the Related Art

In traditional implementations, control and monitoring of computer communication systems primarily concern monitoring and controlling internal parameters of modems and are performed through the use of modem control strings such as "AT commands". AT commands require a user to switch the modem from data to command mode so that the modem can be controlled with AT commands. Thus, AT commands interfere with the typical data flow of the modem and the commands do not reflect the true state of the modem in real time. Of note, in some traditional hardware modem implementations, limited control and status monitoring capabilities are obtained through adding special non-standard hardware interfaces. However, these special hardware interfaces are a relatively expensive solution to the problem of real time modem monitoring and the usage is limited due to its complexity.

If the user chooses not to add the additional network equipment to retrieve the modem information, the user is forced to rely on verbal guidance from another person, such as a support technician, located at a second modem site. This support technician views the parameters of the modem connection from their end of the connection, performs a modem diagnosis based on available resources, and reports configuration options to the user for manual modem control and monitoring. Clearly, this process for modem monitoring and control is unsatisfactory because, among other things, the process requires detailed and easily misunderstood verbal instructions for modem configuration, the process requires the modem to be switched from data to command mode to enter the diagnostic commands for modem configuration, and at least two people are required to diagnose and configure a single modem. Thus, the monitor and configuration process is time consuming and frustrating for those involved.

Of current interest is a computer communication system that overcomes the disadvantages of the related art. Among other advantages and benefits, the computer communication system according to the principles of the present invention monitors, controls, and diagnoses inefficiencies in communication parameters of the computer communication system while one computer system communicates with another computer system. In one embodiment, the computer communication system provides a modem monitor and control system that provides modem monitoring and control without requiring user interaction or switching the modem between data and command modes.

SUMMARY OF THE INVENTION

The principles according to the present invention can be realized through a communication system for monitoring, controlling, or configuring communication parameters of a remote communication device from a local communication system or a local communication device from a remote communication system. For example, the communication system monitors a communication channel that is created between two modems and controls the second modem by adjusting internal settings of the second modem that represent communication parameters. The second modem is communicatively coupled to the first modem to carry out ongoing communications between the first modem and the second modem through the communication channel. Further, a software module is associated with the first modem, and the software module accesses the internal settings of the second modem via the communication channel and performs diagnostics using the internal settings of the second modem. Of course, the software module could access the internal settings of the first modem directly and perform diagnostics using the internal settings of the first modem. Further, the software module can control the internal parameters of the either the second modem or the first modem regardless of which modem the software module is associated with.

The software module of the communication system typically includes a modem interface that interacts with the software module and assists the software module in performing diagnostics using the internal parameters of either the first or the second modem. Also, the software module accesses the communication channel transparently to the ongoing communications between the first modem and the second modem when the software module performs the diagnostics. Further, the software module accesses the communication channel without detrimentally affecting the ongoing communications between the first modem and the second modem. In another embodiment, the software module performs diagnostics using the internal parameters of the second modem via the same communication channel that is used to carry out ongoing communications between the first modem and the second modem. Of note, the software module can also control the internal parameters of the second modem.

The diagnostics performed by the software module of the communication system include monitoring a data stream in the communication channel in view of the internal settings of the second modem. Further, the diagnostics performed by the software module comprise configuring the internal settings of the second modem based on information obtained regarding the data stream between the first modem and the second modem. In addition, the diagnostics performed by the software module comprise controlling the internal settings of the second modem according to information obtained regarding the data stream between the first modem and the second modem.

It should be noted that the software module may include either a user interactive interface for diagnostics, or an automatic interface for diagnostics that requires no further user interaction. Further, the communication system may include a plurality of software modules being associated, respectively, with each of a plurality of modems. Regardless of the number of modems in the communication system, the modems are communicatively coupled via a network. The network is typically selected from the group consisting of a local area network, a wide area network, and a global area network, however, the network may include any combination of a local, wide, or global area network. In other words, the network could operate according to almost any existing network protocol, e.g., a peer-to-peer network, a transmission control protocol/Internet protocol network (TCP/IP), etc.

In another embodiment, the present invention can be described as a communication system comprising a first communication device having internal parameters; a second communication device having internal parameters and being communicatively coupled to the first communication device; a communications link that passes a data stream between the first communication device and the second communication device; and a module associated with the communications link that adjusts the internal parameters of one of the communication devices based on characteristics of the internal parameters of either the first communication device, the second communication device, or both.

In this embodiment, the module may include a communication interface that interacts with the communications link such that the module operates transparently to the data stream of the communications link. Further, the first communication device may be a local communication device and the second communication device may be a remote communication device. In addition, similar to the first embodiment, the communications link operates on a network such as a local area network, a wide area network, or a global area network or a combination thereof. In many embodiments, the communication system is designed for modems operating in a computer communication system. Thus, to assist in understanding the principles according to the present invention, the exemplary embodiments are generally described using computer systems communicating with modems.

A method for adjusting parameters of a communication system includes steps such as establishing a communications link between a first communication device and a second communication device, each communication device having internal parameters influencing communication protocols on the communications link. In addition, the steps include obtaining a software module for interacting with the communications link; retrieving, with the software module, characteristics of the first communication device and/or the second communication device based on the internal parameters of the first communication device, the second communication device, or both, and based on data passing through the communications link; and adjusting the internal parameters according to the retrieved characteristics to optimize communication between the first and the second communication devices on the communications link.

Adjusting the internal parameters may include adjusting the internal parameters of the second communication device, the first communication device, or both. In addition, adjusting the internal parameters may include monitoring or controlling the internal parameters of the first, the second, or both communication devices. Further, retrieving characteristics of the second communication device may comprise retrieving the characteristics transparently to the data passing through the communications link and/or retrieving the characteristics such that the data passing through the communications link is not detrimentally affected.

BRIEF DESCRIPTION OF THE DRAWINGS

A better understanding of the present invention can be obtained when the following detailed description of the preferred embodiment is considered in conjunction with the following drawings.

DETAILED DESCRIPTION OF THE DRAWINGS

Figure 1:
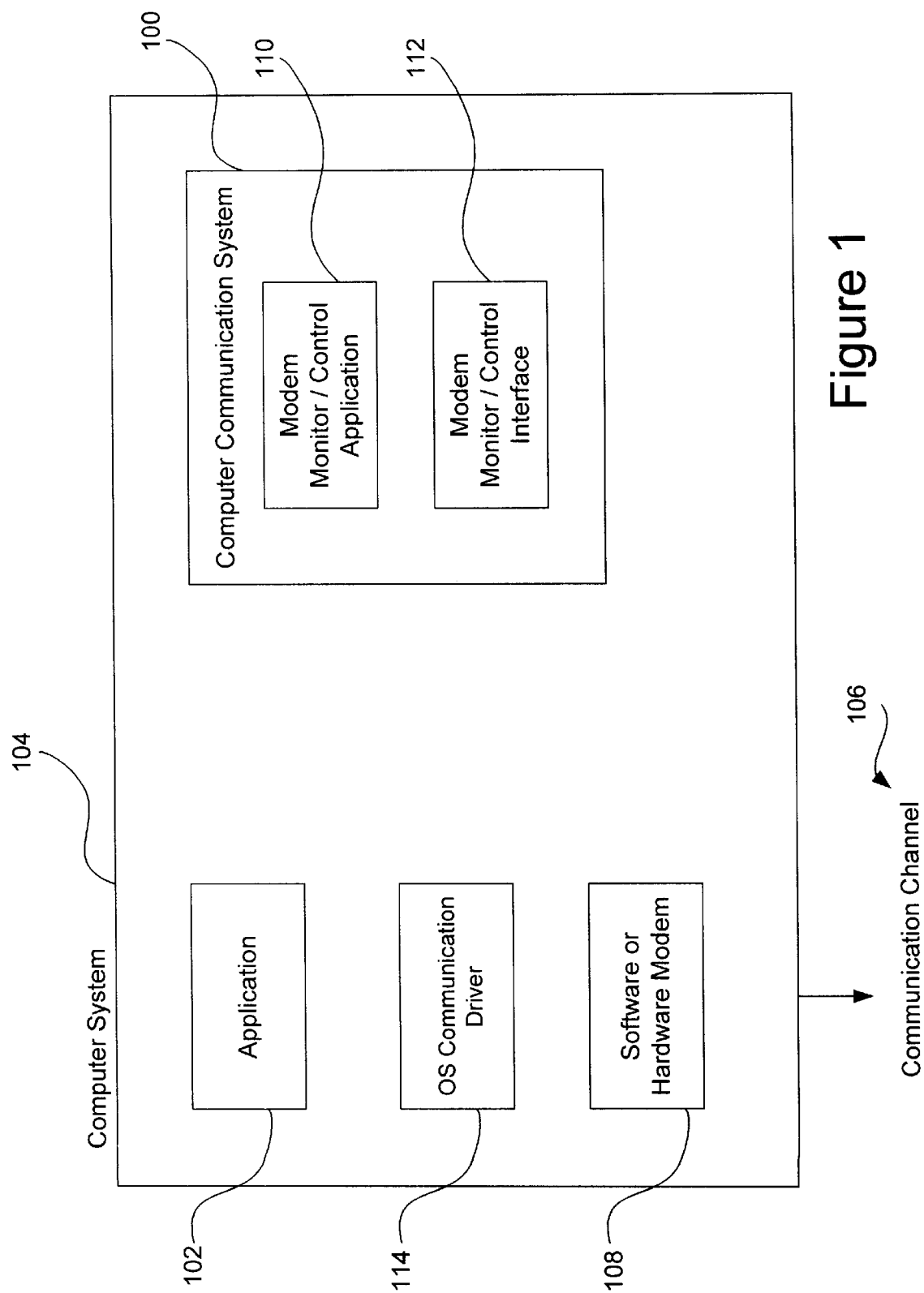
FIG. 1 is a block diagram of an exemplary computer communication system according to the principles of the present invention wherein the system is associated with an application for providing a computer system access to a communication channel via a modem.

FIG. 1 is a block diagram of an exemplary computer communication system 100 that operates according to the principles of the present invention. For ease of understanding, the system 100 is associated with a computer software application 102 for providing a computer system 104 access to a communication channel 106 via a communication device such as a modem 108. The computer software application 102 is commonly a typical computer telecommunications application such as a "web browser", viz., Netscape™, Internet Explorer™, etc., or a modem utility, viz., Procomm™, etc. In short, the computer software application 102 utilizes the modem 108 capabilities to communicate with other modems through the communication channel 106. While the computer software application 102 uses the modem 108 to communicate with other modems, the computer communication system 100 examines the modem parameters of the modem 108 to determine if the modem configuration needs to be modified to attain optimal performance through the communication channel 106. As stated, the computer communication system 100 is an exemplary embodiment that is used to facilitate understanding of the principles according to the present invention. It should be understood that the present invention applies equally well to communication systems that operate with communication devices other than modems. However, for ease of understanding, the present invention will be described relative to computer communication systems using modems as the communication devices.

The computer communication system 100 includes a modem monitor/control application 110 that performs diagnostics on the modem 108 through a modem monitor/control interface 112 (the modem monitor/control application 110 and the modem monitor/control interface 112 sometimes collectively referred to herein as a "software module"). In one embodiment, the computer communication system 100 may perform these diagnostics through the same communication channel that the modem 108 uses to communicate with other modems. Thus, diagnostics can be performed on the "local" modem 108, on other "remote modems" (not shown in FIG. 1), or on both.

Advantageously, the diagnostics can also occur transparently to ongoing communications in the communication channel. Thus, the modem communication connection, a.k.a., the "data stream", of the modem 108 can pass through the communication channel 106 without being detrimentally affected during diagnostics. Further, the diagnostics can be performed via user interaction through the modem monitor/control application 110 or, alternatively, the diagnostics can be performed independently of user interaction through the application 110. As stated, if any changes in the modem parameters are required to obtain optimal performance in the modem 108, the changes can be made without interruption in the data stream. Of course, the modem 108 could be a software modem or a hardware modem or any combination thereof, a pure software modem being defined as a modem implemented entirely in software and relying on a computer's processor to modulate and demodulate signals. Of note, the modem monitor/control interface 112 can be directly coupled to the modem 108 or the modem monitor/control interface 112 could instead be directly coupled to an operating system communication driver 114. These components can be combined in other manners as well. Further, the term "diagnostics", as used herein, refers to monitoring, controlling, or configuring a modem and also refers to other actions that computer software performs in relation to communication devices.

Figure 2:
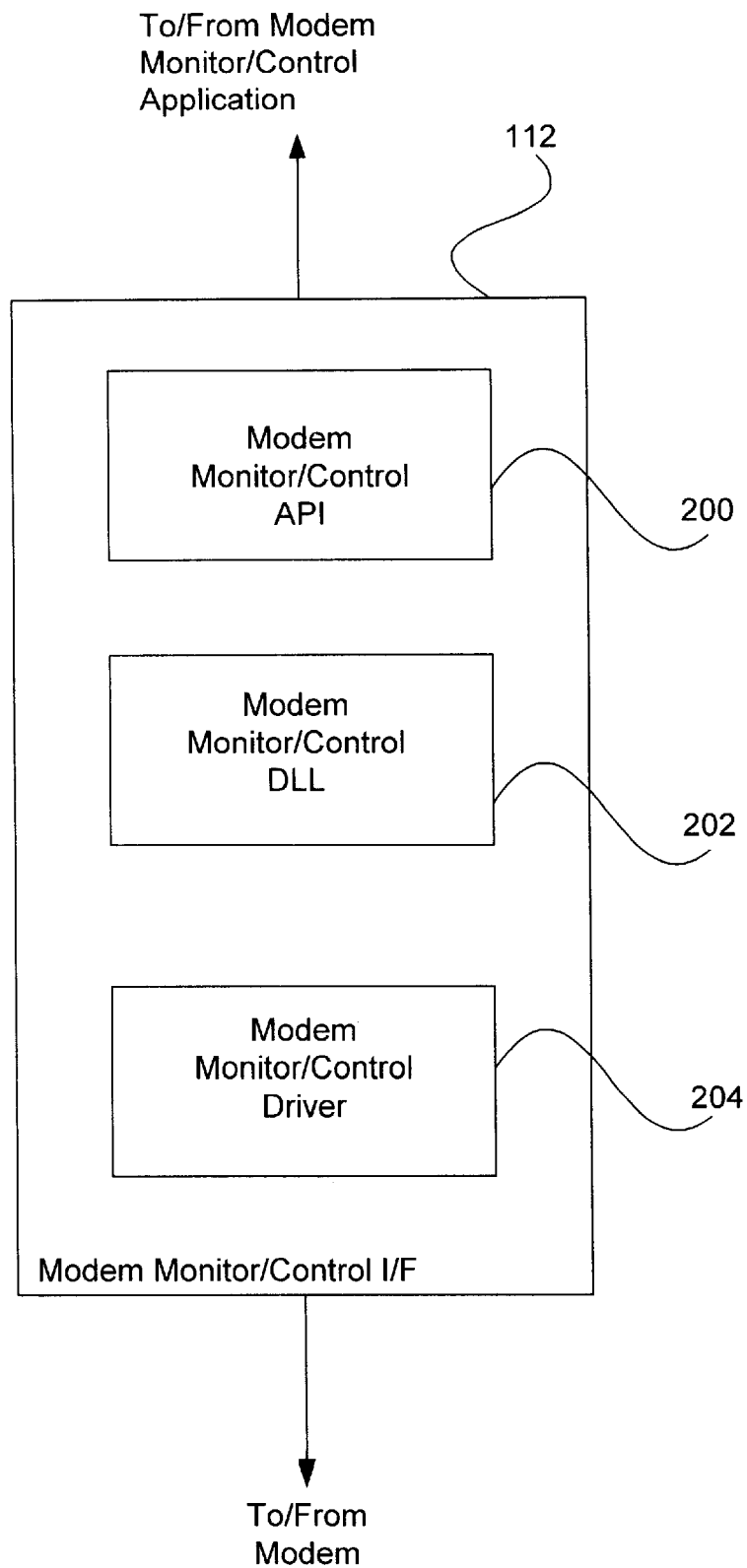
FIG. 2 is a block diagram of an exemplary modem monitor/control interface of the computer communication system of FIG. 1.

FIG. 2 is a block diagram of the exemplary modem monitor/control interface 112 of the computer communication system 100. The modem monitor/control interface 112 includes a modem monitor/control application programming interface (API) 200, a modem monitor/control dynamic link library (DLL) 202 that operates similarly to standard DLL software components, and a modem monitor/control driver 204 that operates similarly to standard software drivers. The API 200 provides code for monitoring and controlling a software modem while the modem is running or passing a data stream (see Appendixes A, B, and C). API 200 provides an easy method to write applications that provide various diagnostics that monitor parameters that change in real time (such as MSE, baud rate, echo canceller coefficiencies, etc.) as well as enabling the writing of applications that allow internal parameters to be modified while a telephony session is in progress. The API 200 can also provide easy means for field support by looking at various parameters and causing the modem to dump data into a file to be investigated later. Further, trouble shooting can be performed by changing various parameters while a data stream is running through the modem. Of note, in a preferred embodiment, the API 200 operates asynchronously and in parallel with the ordinary modem operation and does not interfere with the data stream. Thus, API 200 provides a true view of the modem parameters and does not slow the data transfer process.

Appendixes A, B, and C include exemplary embodiments of code portions of the API 200 and include three functions that could be considered the backbone of the API 200. First, the ModemConfigure function configures parameters within the modem and should be called only before the modem is activated. Second, the ModemControl function changes parameters within the modem to control the modem's operation and can be called during modem operation. Finally, the ModemMonitor function returns the current value of a parameter or set of parameters within the modem and can also be called during modem operation. The first parameter of the above functions is a code indicating which parameter (or parameter set) to monitor or change. The codes can be easily extended from time to time to provide additional visibility and control options for the modem. The same interfaces apply for additional parts of the modem such as speakerphone, tone detection/generation, etc. Thus, the computer communication system 100 is extendable and easy to use and can be used to monitor and control a modem without interfering with the ordinary operation of the modem. Further, the computer communication system 100 provides an easy method to develop applications for modem diagnostics and trouble shooting.

Figure 3:
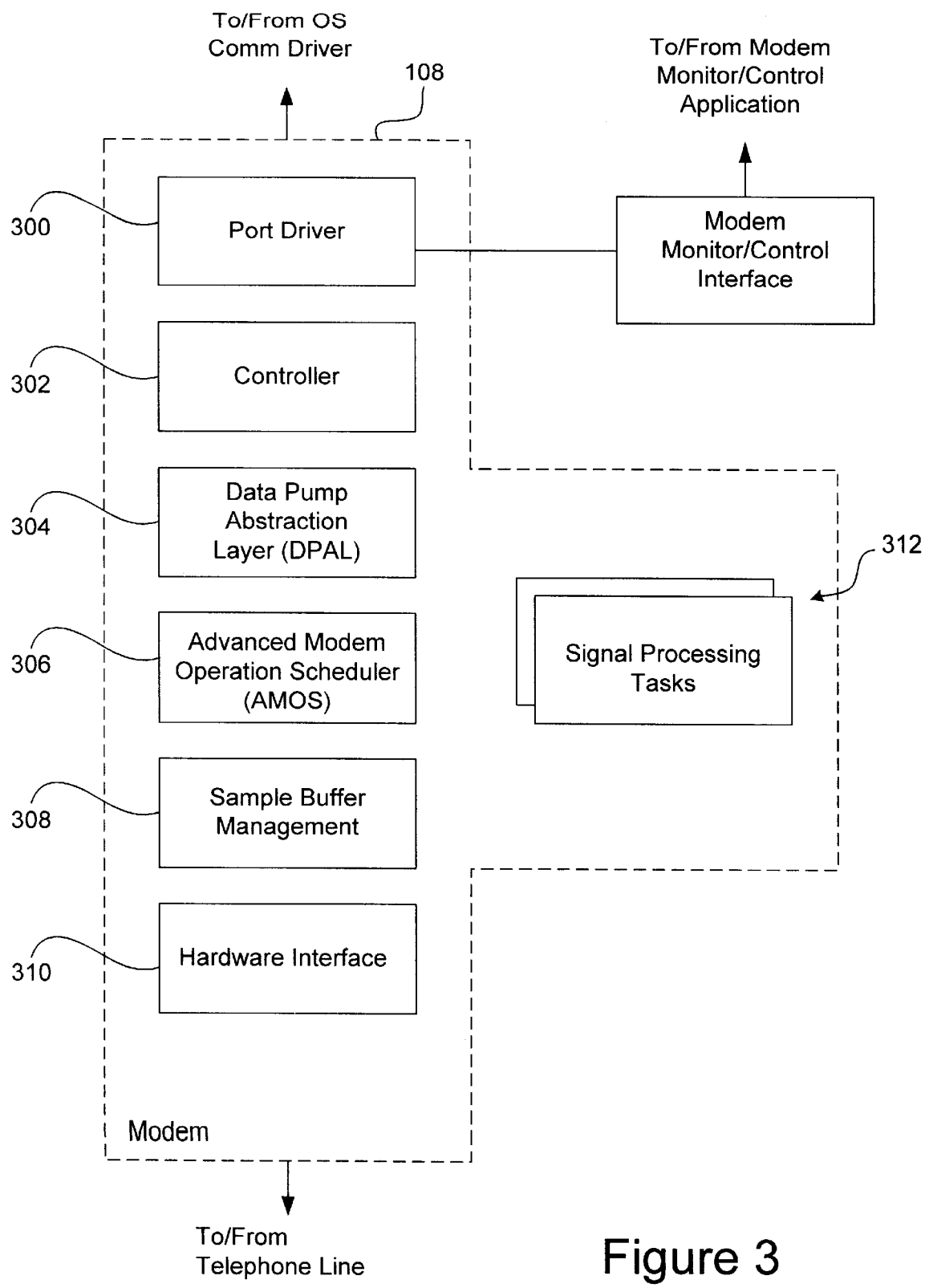
FIG. 3 is a block diagram illustrating an exemplary modem for operation with the computer communication system of FIG. 1.

FIG. 3 is a block diagram illustrating the exemplary modem 108 for operation with the computer communication system 100 that is associated with a computer system 104 for accessing a network. The exemplary modem 108 includes a port driver 300, a controller 302, a data pump abstraction layer 304, an advanced modem operation scheduler 306, a sample buffer management 308, a hardware interface 310, and signal processing tasks 312. Of course, the exemplary modem 108 could be realized in various manners depending on the number of components implemented in software. The components most suited for either a software or a hardware implementation are the controller 302 and the data pump abstraction layer 304. Thus, although other components can be implemented in either hardware or software, the controller 302 and the data pump abstraction layer 304 are most commonly implemented in either hardware or software.

Figure 4:
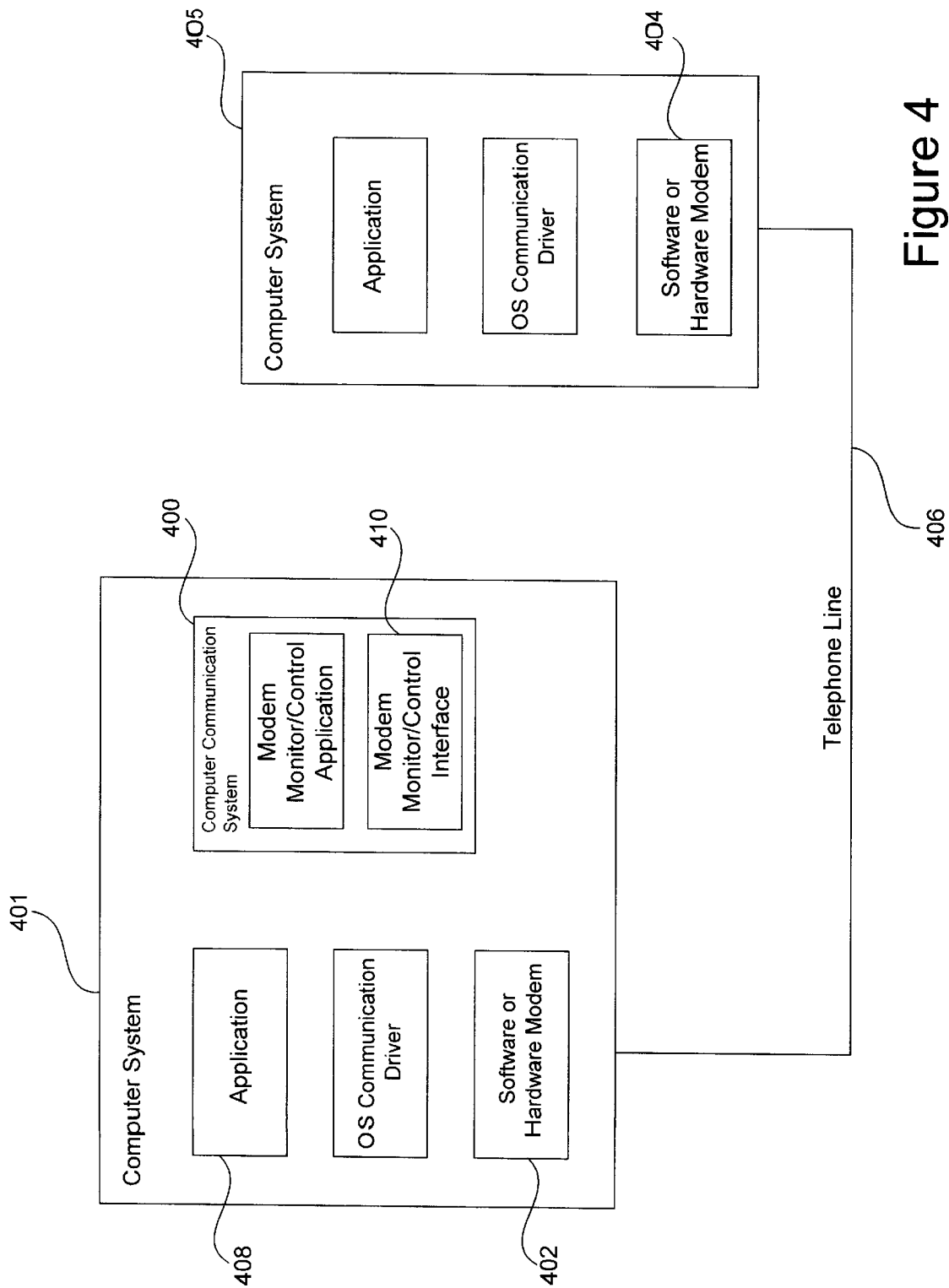
FIG. 4 is a block diagram of an exemplary computer communication system for monitoring and controlling both a local modem and a remote modem over a telephone line.

FIG. 4 is a block diagram of an exemplary computer communication system 400 for monitoring and controlling, in a computer system 401, both a local modem 402 and a remote modem 404 of another computer system 405 over a telephone line 406. Similar to the computer communication system 100, the computer communication system 400 includes a modem monitor/control application 408 and a modem monitor/control interface 410. The local modem 402 can be monitored/controlled just as the modem 108 is monitored and controlled. In addition, the remote modem 404 can be monitored by the computer communication system 400 by using some of the bandwidth of the telephone line 406. Of course, if the communication devices were not modems and they communicated across something other than a telephone line, similar usage of the bandwidth on the line would enable functionality of the communication system 400.

Referring to the telephone line 406, a data stream is created between the local modem 402 and the remote modem 404 that represents a modem connection. The telephone line 406 is used to transfer modem diagnostics and/or control information to/from the remote modem 404 by either "stealing" some of the data bits or using an alternative channel whenever applicable (e.g., V.34 control channel). The extraction of the diagnostics can be performed in one of at least two manners:

1. A specific application can be run on the remote side that extracts modem parameters from the data stream and then sends them via the modem to the local side. The specific application can also receive control commands from the local modem and apply the commands to the remote modem.

2. The remote modem itself multiplexes the diagnostics in the data stream (or the control channel) and monitors control commands without any interference from outside. The multiplexing/demultiplexing can be performed on any of the following two levels: by a data pump, or by an active data protocol (V.42, V.17). This second implementation for extracting diagnostics from the data stream is particularly suitable for software modem implementations where the modem can be easily modified for that kind of data manipulation and a wide variety of modem parameters can be extracted (e.g., see ModemMonCtrl API of the Appendixes).

In this manner, modem parameters from the remote modem 404 can be monitored and the remote modem 404 can be controlled with new parameters being set in the remote modem 404 from the computer communication system 400. Of course, the data stream between the local modem 402 and the remote modem 404 is ongoing and, potentially, the data stream passes without interruption from the computer communication system 400 regardless of whether the modems are software, hardware, or combination software/hardware modems.

Figure 5:
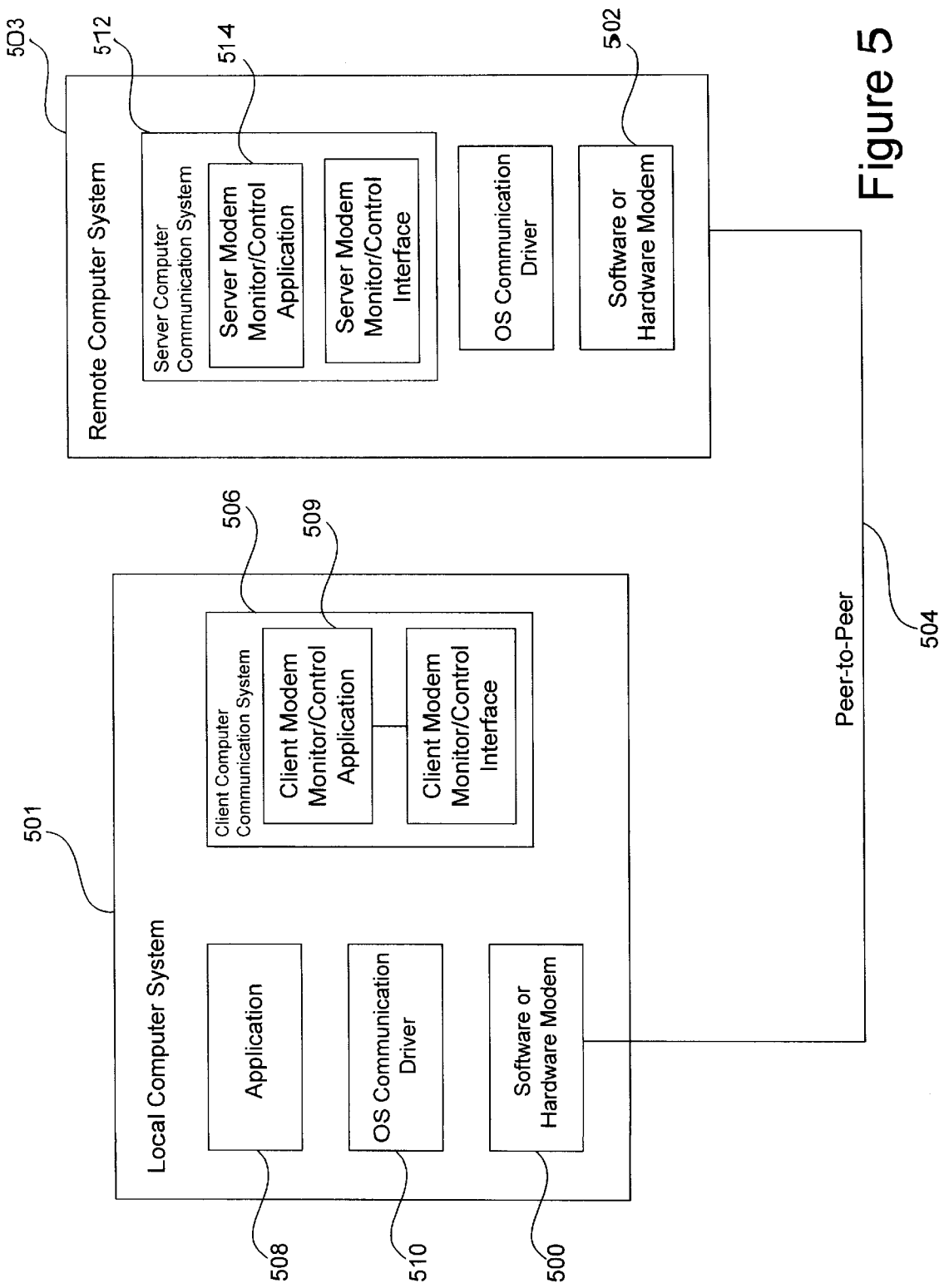
FIG. 5 is a block diagram of exemplary computer communication systems operating modem monitor/control applications, respectively, on both a client modem and a server modem in a peer-to-peer network.

FIG. 5 is a block diagram of exemplary computer communication systems operating modem monitor/control applications, respectively, on both a client modem 500 in a local computer system 501 and a server modem 502 in a remote computer system 503. The local and remote computer systems 501, 503 communicate across a peer-to-peer network 504. A client computer communication system 506 communicates with the client modem 500 while telecommunication software or application 508 having an operating system communication driver 510 uses the client modem 500 to maintain a modem connection across the peer-to-peer network 504. Similar to the computer communication systems 100 and 400, the client computer communication system 506 operates in a manner to monitor/control the client modem 500 by a client modem monitor/control application 509 or by the server modem 502 and a server computer communication system 512. The difference in this embodiment pertains to the computer communication systems including both the client computer communication system 506 and the server computer communication system 512. This arrangement is provided to ensure accurate monitoring and/or controlling of both server and client modems, whereby, the client modem 500 is monitored and controlled by a server modem monitor/control application 514. In addition, this embodiment demonstrates the flexibility of the system according to the present invention.

Figure 6:
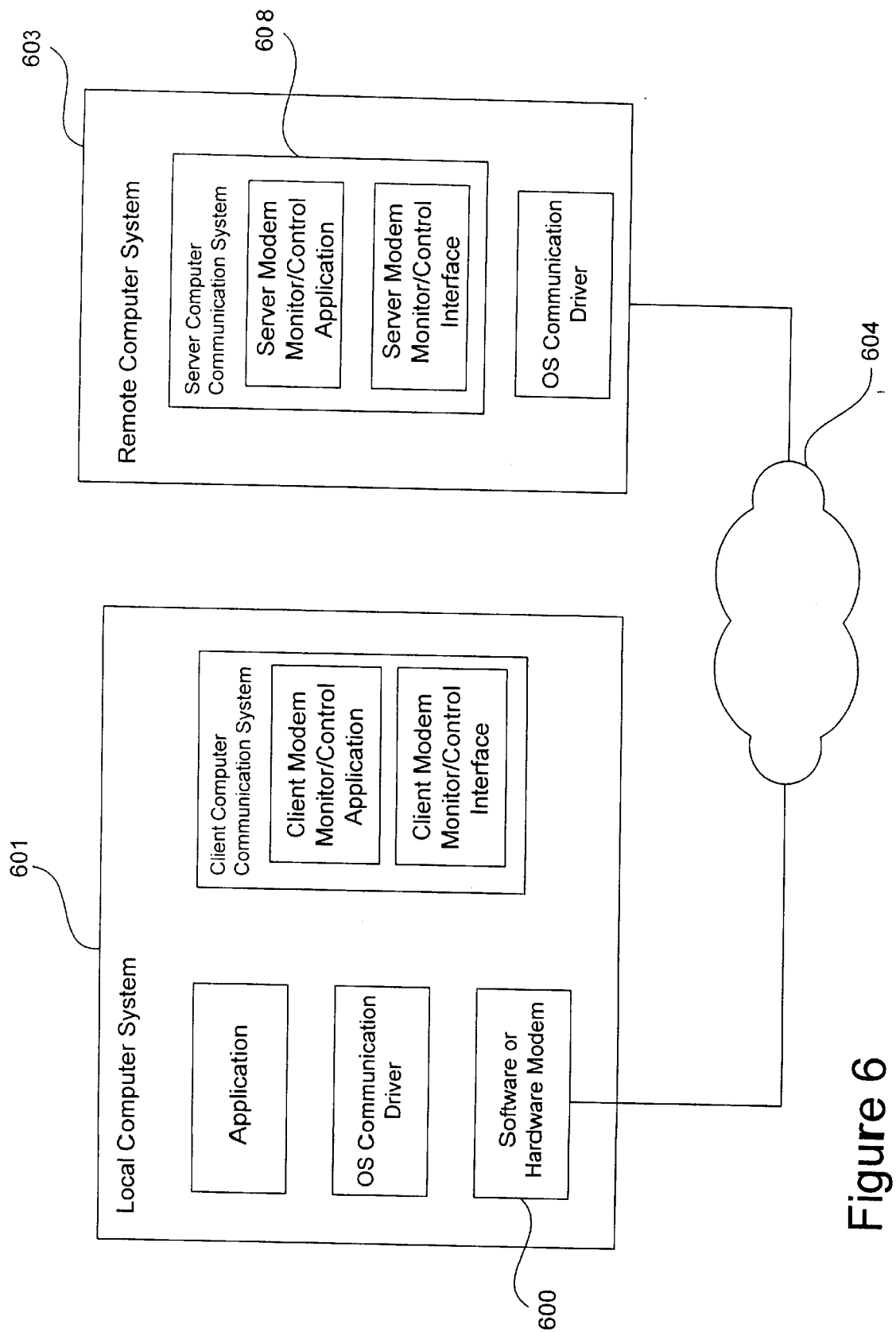
FIG. 6 is a block diagram of exemplary computer communication systems operating modem monitor/control applications, respectively, on both a client modem and a server modem across the Internet.

FIG. 6 is a block diagram of exemplary computer communication systems operating modem monitor/control applications, respectively, on both a client modem 600 in a local computer system 601 and in a remote computer system 603. The local and remote computer systems 601, 603 communicate across a network 604. This embodiment illustrates a structure similar to FIG. 5 except that, rather than peer-to-peer network 504, the local and remote computer systems 601, 603 communicate across a network 604 such as the Internet. Of course, the same advantages and benefits previously described in relation to modem monitoring, control, and diagnostics are realized when the modem 600 operates across the Internet through Internet service providers (ISPs). This extends the flexibility of the system by allowing the client modem 600 to be monitored and controlled from any remote computer system through connection to the server computer communication system 608. Of course, if communication devices other than modems are used to implement communication across the network 604, monitoring/controlling/configuring (i.e., diagnostics) can be performed in a similar manner as described herein.

Figure 7:
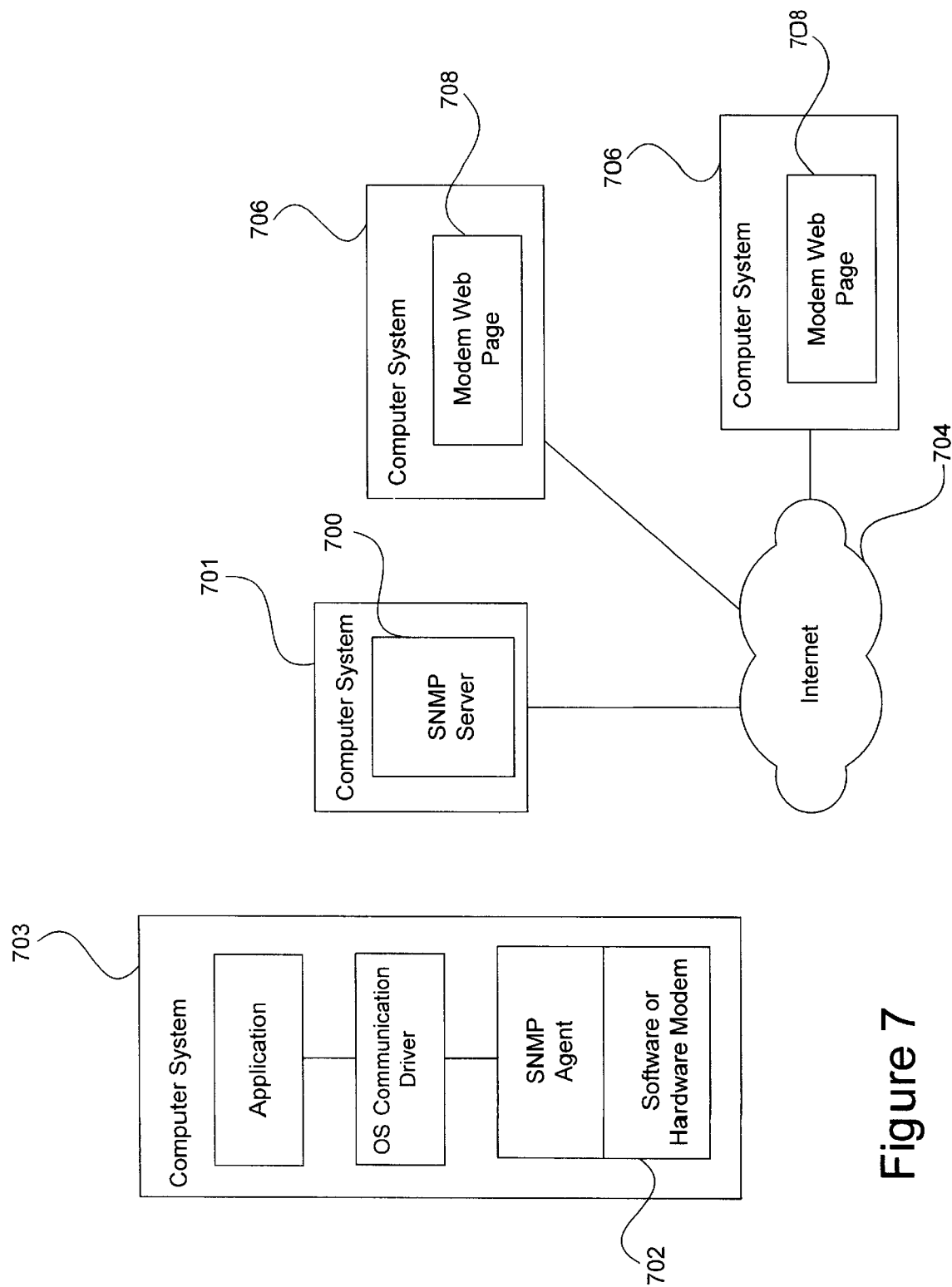
FIG. 7 is a block diagram of an exemplary computer communication system operating according to simple network management protocol (SNMP) parameters such that a management application performs remote trouble shooting of a modem.

FIG. 7 is a block diagram of an exemplary computer communication system operating according to simple network management protocol (SNMP) parameters such that a management application 700 in a computer system 701 performs remote trouble shooting of a modem 702 in another computer system 703. This exemplary embodiment demonstrates how a single manager or system administrator monitors and controls numerous client modems across a network 704. The network 704 will commonly be a network such as the Internet. In this embodiment, SNMP serves as the underlying protocol for the management application 700 because SNMP is a common network management protocol. Thus, a single manager can monitor and control modems such as the modem 702. There is also no limitation as to where on the network 704 that the manager resides, as long as the manager has access to the server. Additional computer systems 706 are illustrated and are used as support tools for the management application 700. The additional computer systems 706 each support a modem web page 708 that enables remote diagnostics of the modem 702 from anywhere on the network 704. Of course, other network management protocols could be used to implement the principles according to the present invention and the description of SNMP operating over the network 704 should not be construed to limit the appended claims.

The above-listed sections and included information are not exhaustive and are only exemplary for certain computer/modem/network systems. The particular sections and included information in a particular embodiment may depend upon the particular implementation and the included devices and resources. Although a system and method according to the present invention has been described in connection with the preferred embodiments, it is not intended to be limited to the specific form set forth herein, but, on the contrary, it is intended to cover such alternatives, modifications, and equivalents as can be reasonably included within the spirit and scope of the invention as defined by the appended claims.

APPENDIX A

```
#ifndef __MODEM_CTRL_H__
#define __MODEM_CTRL_H__
#include <Windows.h>    // To provide types definition, can be replaced by
any alternative type defining file
#include "ModemCodes.h"
#ifdef __cplusplus
extern "C" {
#endif
        VOID WINAPI ModemGetLastError ( PCHAR pBuf, DWORD nBuf );
/*
```

APPENDIX A-continued

The GetModemCodesVersion function returns the version of the control codes
header file.
It should be used to verify coherence between the modem control API user and
provider.
*/
        DWORD WINAPI ModemGetCodesVersion( );
/*
The ModemOpen function returns a handle that can be used to access
a data-pump object.
Parameters:
dwDpIdCode - Specifies the type identification code of the data pump.
        This value identifies the specific data pump to be monitored or
controled.
        The data pump type identification codes are defined by the type
RK_DP_IDS
        (file "ModemCodes.h").
Return Values:
If the specified data pump type exists and the function succeeds,
the return value is an open handle to the specified modem.
If the function fails, the return value is INVALID_HANDLE_VALUE.
*/
HANDLE WINAPI ModemOpen(
        DWORD dwDpIdCode
    );
/*
The ModemClose function closes an open object handle.
Parameters:
hModem - Identifies an open object handle to one of the following objects:
        CModem
Return Values:
If the function succeeds, the return value is TRUE.
If the function fails, the return value is FALSE.
*/
BOOL WINAPI ModemClose(
        HANDLE hModem     // handle to object to close
    );
/*
The functions: ModemConfigure, ModemControl, ModemMonitor
send a control code to a specific CModem object,
causing the corresponding device to perform the specified operation.
ModemConfigure has to be called BEFORE the specified modem has been
activated.
ModemControl and ModemMonitor may be called DURING modem operation.
Parameters:
hModem - Handle to the CModem instance that is to perform the operation.
           Call the CreateModem function to obtain a CModem handle.
dwConfigCode/dwControlCode/dwMonitorCode - Specify the control code for the
operation.
           This value identifies the specific configuration to be performed
by
           ModemConfigure/ModemControl/ModemMonitor respectively.
           The control codes are defined by types
RK_CFG_CODES/RK_CTL_CODES/RK_MON_CODES
           (file "ModemCodes.h").
pInBuffer - Pointer to a buffer that contains the data required to perform
the operation.
           This parameter can be NULL if the dwConfigCode parameter
specifies an operation
           that does not require input data.
nInBufferSize - Specifies the size, in bytes, of the buffer pointed to by
pInBuffer.
pOutBuffer - Pointer to a buffer that receives the operation's output data.
           This parameter can be NULL if the dwConfigCode parameter
specifies an operation
           that does not produce output data.
nOutBufferSize - Specifies the size, in bytes, of the buffer pointed to by
pOutBuffer.
pBytesReturned - Pointer to a variable that receives the size, in bytes,
           of the data stored into the buffer pointed to by pOutBuffer.
Return Values:
If the function succeeds, the return value is TRUE.
If the function fails or the specified operation is not supported
for the specified object, the return value is FALSE.
*/
 BOOL WINAPI ModemConfigure(
        HANDLE    hModem,                // handle to CModem instance of interest
        DWORD     dwConfigCode,     // control code of operation to perform
        PVOID     pInBuffer,        // pointer to buffer to supply input data
        DWORD     nInBufferSize,    // size of input buffer

APPENDIX A-continued

```
          PVOID       pOutBuffer,          // pointer to buffer to receive output data
          DWORD       nOutBufferSize,      // size of output buffer
          PDWORD      pBytesReturned       // pointer to variable to receive output byte
count
      );
  BOOL WINAPI ModemControl(
          HANDLE      hModem,              // handle to CModem instance of interest
          DWORD       dwControlCode,       // control code of operation to perform
          PVOID       pInBuffer,           // pointer to buffer to supply input data
          DWORD       nInBufferSize,       // size of input buffer
          PVOID       pOutBuffer,          // pointer to buffer to receive output data
          DWORD       nOutBufferSize,      // size of output buffer
          PDWORD      pBytesReturned       // pointer to variable to receive output byte
count
      );
  BOOL WINAPI ModemMonitor(
          HANDLE      hModem,              // handle to CModem instance of interest
          DWORD       dwControlCode,       // control code of operation to perform
          PVOID       pInBuffer,           // pointer to buffer to supply input data
          DWORD       nInBufferSize,       // size of input buffer
          PVOID       pOutBuffer,          // pointer to buffer to receive output data
          DWORD       nOutBufferSize,      // size of output buffer
          PDWORD      pBytesReturned       // pointer to variable to receive output byte
count
      );
#ifdef __cplusplus
}
#endif
#endif //__MODEM_CTRL_H__
```

APPENDIX B

```
#ifndef __MODEM_CODES_H__
#define __MODEM_CODES_H__
#define MODEM_CODES_              8
VERSION
// rate masks returned by RKMON_SUPPORTED_BIT_RATE
#define RK_RATE_MASK_75         0x00000001
#define RK_RATE_MASK_300        0x00000002
#define RK_RATE_MASK_600        0x00000004
#define RK_RATE_MASK_1200       0x00000008
#define RK_RATE_MASK_2400       0x00000010
#define RK_RATE_MASK_4800       0x00000020
#define RK_RATE_MASK_7200       0x00000040
#define RK_RATE_MASK_9600       0x00000080
#define RK_RATE_MASK_12000      0x00000100
#define RK_RATE_MASK_14400      0x00000200
#define RK_RATE_MASK_16800      0x00000400
#define RK_RATE_MASK_19200      0x00000800
#define RK_RATE_MASK_21600      0x00001000
#define RK_RATE_MASK_24000      0x00002000
#define RK_RATE_MASK_26400      0x00004000
#define RK_RATE_MASK_28800      0x00008000
#define RK_RATE_MASK_31200      0x00010000
#define RK_RATE_MASK_33600      0x00020000
#define RK_RATE_MASK_32000      0x00040000
#define RK_RATE_MASK_34000      0x00080000
#define RK_RATE_MASK_36000      0x00100000
#define RK_RATE_MASK_38000      0x00200000
#define RK_RATE_MASK_40000      0x00400000
#define RK_RATE_MASK_42000      0x00800000
#define RK_RATE_MASK_44000      0x01000000
#define RK_RATE_MASK_46000      0x02000000
#define RK_RATE_MASK_48000      0x04000000
#define RK_RATE_MASK_50000      0x08000000
#define RK_RATE_MASK_52000      0x10000000
#define RK_RATE_MASK_54000      0x20000000
#define RK_RATE_MASK_56000      0x40000000
// DataPump type codes
typedef enum {
    RKID_V32BIS = 0,
    RKID_V34,
    RKID_V22BIS,
    RKID_V23,
    RKID_V21,
    RKID_V17,
```

APPENDIX B-continued

```
    RKID_V29,
    RKID_V27,
    RKID_V8,
    RKID_TONE_DET,
    RKID_TONE_GEN,
    RKID_DTMF_DET,
    RKID_DTMF_GEN,
    RKID_CR_TONE_DET,
    RKID_CR_TONE_GEN,
    RKID_RKSAMPLE,
    RKID_ANS_DET,
    RKID_ANS_GEN,
    RKID_WINAC,
    RKID_ROKV42,
    RKID_K56FLEX,
    RKID_BELL103,
    RKID_BELL212A,
    RKID_SPKP,
    RKID_VOICE,
    RKID_V90,
    RKID_AMOS,
    RKID_LAST,
} RK_DP_IDS;
// Offset definitions:
#define COMMON_RK_CODES      0
#define RKSAMPLE_RK_CODES    2000
#define WINAC_RK_CODES       3000
#define V42_RK_CODES         4000
#define AUTOMODE_RK_CODES    6000
#define V8_RK_CODES          7000       // V8, V8BIS
#define V21_RK_CODES         10000
#define V22_RK_CODES         11000      // V22, Bell-212A
#define FSK_RK_CODES         12000      // V23, Bell-103
#define FAX_RK_CODES         14000      // V27, V27BIS, B27TER, V29, V17
#define V32_RK_CODES         16000      // V32, V32BIS
#define V34_RK_CODES         18000
#define V90_RK_CODES         20000      // K56FLEX, V90
#define SPKP_RK_CODES        25000
#define VOICE_RK_CODES       26000
#define AMOS_RK_CODES        27000
// Modem Config Codes                                      Parameter
(In)          Parameter (Out)
typedef enum
{
// ********* Common Constants **********
    // Select Symbol Rate (no impact if Autorate is enabled)
    RKCFG_TX_SYMBOL_RATE = COMMON_RK_CODES,     //          INT -
Symbol Rate None
    RKCFG_RX_SYMBOL_RATE,                       //          INT
- Symbol Rate    None
    // Force Bit Rate
    RKCFG_BIT_RATE_RX_MAX,                      //          INT
- Bit Rate       None
    RKCFG_BIT_RATE_TX_MAX,                      //          INT
- Bit Rate       None
    RKCFG_BIT_RATE_RX_MIN,                      //          INT
- Bit Rate       None
    RKCFG_BIT_RATE_TX_MIN,                      //          INT
- Bit Rate       None
    // Select connection type ( Half or Full Duplex )
    //RKCFG_CONNECTION_TYPE,                    //    DWORD
(FDplex=0, HDplex=1)    None
    // Tx Transmittion Power: {Minimum, Maximum, Default, Offset}
    // (values in dBm, offset in dB). Offset is for compensation on
hardware gain.
    RKCFG_TX_SIGNAL_POWER,                      //
    char[4]              None
    // Enable/Disable Rate Renegotiation
    RKCFG_RENEG_ENABLE,                                   //
    BOOL - Yes/No        None
    // Enable/Disable Retrain
    RKCFG_RETRAIN_ENABLE,                       //          BOOL
- Yes/No         None
    // Enable/Disable Rx Freeze
    RKCFG_RX_FREEZE_ENABLE,                     //          BOOL
- Yes/No         None
    // Enable/Disable Echo Canceller Freeze
    RKCFG_EC_FREEZE_ENABLE,                     //          BOOL
```

APPENDIX B-continued

```
- Yes/No       None
    RKCFG_RECORD_SESSION,                      //      BOOL
- Yes/No       None
    RKCFG_SESSION_NAME,                        //
    char * name       None
    RKCFG_NO_CARRIER_TIMEOUT,                  //
    DWORD - in seconds       None
    RKCFG_START_AT_DATA,                       //      BOOL
- Yes/No       None
    RKCFG_REMOTE_IS_ROCKWELL,                  //      BOOL
- Yes/No       None
    RKCFG_MODEM_SETTINGS,
// ********* Win AC Constants *************
    RKCFG_EC_MODE = WINAC_RK_CODES,            //
    DWORD(ERROR_CONTROL_MODE)
    RKCFG_CMPRS_MODE,                          //
    DWORD(COMPRESSION_MODE)
    RKCFG_ACTIVE_MODULATION,                   //
    DWORD(RK_DP_IDS)
// ********* Auto-Mode Constants **********
    // Enable/Disable Automode
    RKCFG_AUTOMODE_ENABLE =AUTOMODE_RK_CODES,//        BOOL -
Yes/No       None
    // Transmit Timeout for detection for V32
    RKCFG_TRANSMIT_TIMEOUT,                    //
    DWORD ms  None
// ********* V8 Constants **********
    RKCFG_V8_SUPPORT_CI   = V8_RK_CODES,       //      BOOL-
Yes/No       None
    RKCFG_V8_CI_CALLING_FUNCTION_SEQUENCE,     //      BYTE
            None
    RKCFG_V8_CI_ON_CADENCE,                    //
    DWORD ms cadence   None
    RKCFG_V8_CI_OFF_CADENCE,                   //
    DWORD ms cadence    None
    RKCFG_V8_AS_CI_DET,                        //
    BOOL              None
//********* V21 Constants **********
    RKCFG_V21RX_HIGH_CHANNEL = V21_RK_CODES,// BOOL -
Yes/No       None
    RKCFG_V21TX_HIGH_CHANNEL,                  //      BOOL
- Yes/No       None
    RKCFG_V21_DATA_MODE,                       //      BOOL
            None
// ********* V22 Constants (V22, Bell-212A) **********
    RKCFG_V22_TO_BELL_212A = V22_RK_CODES,  // BOOL -
Yes/No       None
// ********* FSK Modulations Constants (V23, Bell-103) **********
    RKCFG_FSK_BACK_CHANNEL = FSK_RK_CODES,  // BOOL -
Yes/No       None
    RKCFG_FSK_V23_CHANNEL,                     //      BOOL
- Yes/No       None
    RKCFG_FSK_BELL103_CHANNEL,                 //      BOOL
- Yes/No       None
    RKCFG_FSK_CID,                             //
    BOOL - Yes/No              None
// ********* Fax Constants (V27, V29, V17) **********
    // Define Retrain between Pages as Short or Long
    RKCFG_LONG_RETRAIN       = FAX_RK_CODES, //        BOOL
(TRUE=Long) None
// ********* V32 Constants **********
    RKCFG_V32BIS_TO_V32      = V32_RK_CODES,  //       BOOL -
    Yes/No          None
    RKCFG_V32_TRELLIS_SUPPORT,                 //      BOOL
-   Yes/No          None
// ********* V34 Constants **********
    // Select Carrier Frequency
    RKCFG_RX_CARRIER_FREQ    = V34_RK_CODES,  //
    V34_carrier_t              None
    // Enable/Disable Transmit Power Drop
    RKCFG_TX_POWER_DROP_ENABLE,                //      BOOL
- Yes/No       None
    // Select Transmit Power Level
    RKCFG_TX_POWER_DROP,                       //      INT
```

APPENDIX B-continued

```
- Level            None
    // Select Requested Power Drop
    RKCFG_REQUESTED_POWER_DROP,         //
    DWORD          None
    // Enable/Disable Precoding
    RKCFG_PRECODING_ENABLE,             //              BOOL
- Yes/No           None
    // Set Precoding Coefficients
    RKCFG_PRECODING_COEFFS,             //   SHORT[6] - Array
of coeffs      None
    // Transmitter Preemphasis Filter
    RKCFG_TX_PREEMPHASIS_FILTER         //              INT -
Filter Index       None
    // Requested Preemphasis Filter
    RKCFG_REQUESTED_PREEMPHASIS_FILTER, //              INT -
Filter Index       None
    // Enable/Disable Constellation Expansion
    RKCFG_CONSTELATION_EXPAND_ENABLE,   //              BOOL -
Yes/No         None
    // Enable/Disable Warping
    RKCFG_WARP_ENABLE,                  //
    BOOL - Yes/No      None
// ********* V90 Constants (K56FLEX, V90) *********
    // set the encoding law for flex 1 indicates A-law coding, 0 indicates
u-law
    RKCFG_ENCODING_LAW   = V90_RK_CODES //              BOOL
(TRUE=A_Law) None
// ********* SpeakerPhone Constants *********
    // Hardware Delay
    RKCFG_EC_DELAY       = SPKP_RK_CODES,  //{SPKP_MODULE, INT - No of
Samples}       None
    // Cross-Correlator Length
    RKCFG_CC_LENGTH,                    //              INT
- No of Taps       None
    RKCFG_DMP_MASK,
    RKCFG_INITIAL_FULL_DUPLEX_MEASURE,
} RK_CFG_CODES;
// Modem Control Codes
typedef enum
{
// ********* Common Constants *********
    // Initiate Retrain
    RKCTL_RETRAIN        = COMMON_RK_CODES,  //         None
            None
    // Initiate Rate Renegotiation
    RKCTL_RENEG,                        //
    INT - Bit Rate          None
    // Terminate Connection Gracefully
    RKCTL_CLEARDOWN,                    //              None
                    None
    // Squelch Tx Signal
    RKCTL_TX_SQUELCH,                   //              None
                    None
    // Use the SendCommand
    RKCTL_SEND_COMMAND,                 //
{DWORD[2] - Command, Param}     None
    // WinAC constants
    RKCTL_MODEM_SLEEP = WINAC_RK_CODES, //              DWORD
            None
// ********* Fax Constants (V27, V29, V17) *********
    // Define Retrain between Pages as Short or Long
    RKCTL_LONG_RETRAIN   = FAX_RK_CODES,  //            BOOL
(TRUE=Long) None
// ********* V34 Constants *********
    // Must be sent before KRMON_DATA_RES_ECHO_GET
    RKCTL_DATA_RES_ECHO_REQUEST=V32_RK_CODES,//         None
            None
// ********* SpeakerPhone Constants *********
    // Speakerphone Mode (FD, HD, HS)
    RKCTL_SPKP_MODE      = SPKP_RK_CODES,  //           SPKPMode
            None
    // Output Mute
    RKCTL_IO_MUTE,                      //
    {SPKP_PROBE, BOOL - Yes/No{    None
    // Echo Cancellers
    RKCTL_FILTER_LENGTH,                //   {SPKP_MODULE, INT - No of
Taps} None
    RKCTL_EC_OPERATE,                   //   {SPKP_MODULE, BOOL -
```

APPENDIX B-continued

```
Yes/No}         None
    RKCTL_ADAPT_ENABLED,                              //    {SPKP_MODULE, BOOL -
Yes/No}         None
    // AGC and Sw-Loss
    RKCTL_AMP_ENABLED,                                //
    {SPKP_MODULE, BOOL - Yes/No}      None
    // Gains
    RKCTL_GAIN,                      // {SPKP_MODULE*, INT*/FLOAT* -
Gain, GAIN_FORMAT*}    None
    RKCTL_INIT_GAIN,
    RKCTL_MAX_GAIN,
    RKCTL_FULL_DUPLEX_MEASURE,
    RKCTL_NOISE_INSERTION_LENGTH,
    RKCTL_NOISE_INSERTION_ENABLE,
    RKCTL_FADE_IN_LENGTH,
    RKCTL_FADE_IN_ENABLE,
    RKCTL_UPSTEP,
    RKCTL_MIN_LINE_OUT_POWER,
    RKCTL_LINE_OUT_SILENCE_GAIN_REDUCTION,
// ********* AMOS Constants **********
    RKCTL_CREATE_DATAPUMP = AMOS_RK_CODES,
    RKCTL_DESTROY_DATAPUMP,
} RK_CTL_CODES;
// Modem Monitor Codes
typedef enum
{
// ********* Common Constants **********
    RKMON_TX_SAMPLE_RATE = COMMON_RK_CODES,    //          None
            DWORD - Sample Rate
    RKMON_RX_SAMPLE_RATE,                              //          None
            DWORD - Sample Rate
    RKMON_TX_SYMBOL_RATE,                              //          None
            INT - Symbol Rate
    RKMON_RX_SYMBOL_RATE,                              //          None
            INT - Symbol Rate
    RKMON_TX_BIT_RATE,                                 //
None            INT - Bit Rate
    RKMON_RX_BIT_RATE,
None            INT - Bit Rate
    RKMON_TX_CARRIER_FREQUENCY,                        //          None
            DWORD - (Hz)
    RKMON_RX_CARRIER_FREQUENCY,                        //          None
            DWORD - (Hz)
    RKMON_TX_SIGNAL_POWER,                             //          None
            Float - (dBm)
    RKMON_RX_SIGNAL_POWER,                             //          None
            Float - (dBm)
    // Constellation points
    RKMON_RX_SCATTER,                                  //          None
            float* - pointer to pairs of points
    // Gain needed for scatter plot
    RKMON_RX_NORM_FACTOR,                              //          None
            float
    RKMON_ROUND_TRIP_DELAY,                            //          None
            INT - R.T.D. in 8k samples per sec.
    // M.S.E at Rate selection (dB)
    RKMON_BASE_MSE,                                    //
None            Float
    // Mean Square Error [dB]
    RKMON_MSE,                                         //
None            Float
    // Signal to Noise Ratio (dB)
    RKMON_SNR,                                         //
None            Float
    RKMON_EQM,                                         //
None            float - (dB)
    RKMON_SUPPORTED_BIT_RATES_MASK,     //          None
            DWORD (masks of RK_RATE_MASK_ defined above)
    RKMON_FE_ECHO_DELAY,
    RKMON_AUDIO_TX_SAMPLE_RATE,                        //          None
            DWORD - Sample Rate
    RKMON_AUDIO_RX_SAMPLE_RATE,                        //          None
            DWORD - Sample Rate
    RKMON_SETTINGS_INFO,
    RKMON_SETTINGS_BLOCKS,
```

APPENDIX B-continued

```
// ********* Rksample Constants **********
    // Num of microseconds in last interrupt
    RKMON_LAST_INT_CPU = RKSAMPLE_RK_CODES,    //            None
            DWORD
    // Num of microseconds between last 2 interrupts
    RKMON_LAST_INT_LATENCY,                    //            None
            DWORD
    // Num of microseconds in longest interrupt
    RKMON_MAX_INT_CPU,                         //
None            DWORD
    // Longest latency between 2 interrupts (microseconds)
    RKMON_MAX_INT_LATENCY,                     //            None
            DWORD
    // Num of samples overrun occurred in the past
    RKMON_SAMPLES_OVERRUNS,                    //            None
            DWORD
    // Num of samples occurred in the past
    RKMON_SAMPLES_UNDERRUNS,                   //            None
            DWORD
    // Num of bus overruns occurred in the past
    RKMON_BUS_OVERRUNS,                        //            None
            DWORD
    // Num of bus underruns occurred in the past
    RKMON_BUS_UNDERRUNS,                       //            None
            DWORD
    // Operating speed
    RKMON_OPERATING_SPEED,                     //            None
            DWORD
// ********* WinAc Constants **********
    // Index (WinAc style) of the active modulation
    RKMON_ACTIVE_MODULATION=WINAC_RK_CODES,    //     None
            DWORD
    RKMON_MODEM_STATE,                         //
None            DWORD
    RKMON_MODEM_SLEEP,                         //
None            DWORD
    // RKMON_CALL_SETUP_RES - identical
    // to field no. 1 in AT#UD
    RKMON_CALL_SETUP_RES,                      //            None
            DWORD
    //RKMON_MULTI_MEDIA_MODE - identical
    // to field no. 2 in AT#UD
    RKMON_MULTI_MEDIA_MODE,                    //            None
            DWORD
    // RKMON_V8_CM - identical to field no.
    // 4 in AT#UD. Returns a pointer to string.
    RKMON_V8_CM,                               //
None            PCHAR
    // RKMON_V8_JM - identical to field no.
    // 5 in AT#UD. Returns a pointer to string.
    RKMON_V8_JM,                               //
None            PCHAR
    // RKMON_TX_NEG_RES - identical to
    // field no. 20 in AT#UD
    RKMON_TX_NEG_RES,                          //            None
            DWORD
    // RKMON_RX_NEG_RES - identical to
    // field no. 21 in AT#UD
    RKMON_RK_NEG_RES,                          //            None
            DWORD
    // RKMON_CARRIER_LOSS_EV_CNT -
    // identical to field no. 30 in AT#UD
    RKMON_CARRIER_LOSS_EV_CNT,                 //            None
            DWORD
    // RKMON_RATE_RENEG_EV_CNT -
    // identical to field no. 31 in AT#UD
    RKMON_RATE_RENEG_EV_CNT,                   //            None
            DWORD
    // RKMON_RTRN_3REQ - identical to field
    // no. 32 in AT#UD
    RKMON_RTRN_REQ,                            //
None            DWORD
    // RKMON_RTRN_GRANTED - identical to
    // field no. 33 in AT#UD
    RKMON_RTRN_GRANTED,                        //
None            DWORD
    // RKMON_PROTOCOL_NEG_RES - identical
    // to field no. 40 in AT#UD
```

APPENDIX B-continued

```
        RKMON_PROTOCOL_NEG_RES,           //         None
                DWORD
// RKMON_EC_FRAME_SIZE - identical to
// field no. 41 in AT#UD
        RKMON_EC_FRAME_SIZE,              //         None
                DWORD
// RKMON_EC_LINK_TIMEOUTS - identical
// to field no. 42 in AT#UD
        RKMON_EC_LINK_TIMEOUTS,           //         None
                DWORD
// RKMON_EC_LINK_NAKS - identical to
// field no. 43 in AT#UD
        RKMON_EC_LINK_NAKS,                         //
None                    DWORD
// RKMON_CMPRS_NEG_RES - identical to
// field no. 44 in AT#UD
        RKMON_CMPRS_NEG_RES,              //         None
                DWORD
        RKMON_CMPRS_DICT_SIZE - identical to
// field no. 45 in AT#UD
        RKMON_CMPRS_DICT_SIZE,            //         None
                DWORD
// RKMON_TX_FLOW_CTRL - identical to
// field no. 50 in AT#UD
        RKMON_TX_FLOW_CTRL,                         //
None                    DWORD
// RKMON_RX_FLOW_CTRL - identical to
// field no. 51 in AT#UD
        RKMON_RX_FLOW_CTRL,                              //
None                    DWORD
// RKMON_TOTAL_TX_CHARS - identical to
// field no. 52 in AT#UD
        RKMON_TOTAL_TX_CHARS,             //         None
                DWORD
// RKMON_TOTAL_RX_CHARS - identical to
// field no. 53 in AT#UD
        RKMON_TOTAL_RX_CHARS,             //         None
                DWORD
// RKMON_TERMINATION_CAUSE - identical
// to field no. 60 in AT#UD
        RKMON_TERMINATION_CAUSE,          //         None
                DWORD
// RKMON_CALL_WAIT_EV_CNT - identical
// to field no. 61 in AT#UD (not supported)
        RKMON_CALL_WAIT_EV_CNT,           //         None
                DWORD
        RKMON_CPU_VENDOR,                 //         None
                PCHAR
        RKMON_CACHE_SIZE,                 //         None
                DWORD
        RKMON_NUMBER_CALLED,              //         None
                PCHAR
        RKMON_TIMER_RESOLUTION,           //         None
                DWORD
// ********* V42 Constants **********
    // Number of V42 BLERS
        RKMON_BLER             = V42_RK_CODES, //    None
                DWORD
// ********* Fax Constants (V27, V29, V17) **********
    // Whether Retrain between Pages is Short or Long
        RKMON_LONG_RETRAIN     = FAX_RK_CODES, //    None
                BOOL (TRUE=Long)
// ********* V34 Constants **********
    // Transmit Power Drop [dB]
        RKMON_TX_POWER_DROP    = V34_RK_CODES, //    None
                INT
    // Power Drop [dB] that was requested from remote modem
        RKMON_RX_POWER_DROP,              //         None
                INT
    // Transmitter Preemphasis Filter
        RKMON_TX_PREEMPHASIS_FILTER,      //         None
                INT - Filter Index
    // other side's Preemphasis Filter
        RKMON_RX_PREEMPHASIS_FILTER,      //         None
                INT - Filter Index
    // Residual Echo in training [dB]
        RKMON_TRN_RESIDUAL_ECHO,          //         None
                Float
```

APPENDIX B-continued

```
    // Residual Echo in data [dB] (must be sent after
RKCTL_DATA_RES_ECHO_REQUEST)
    RKMON_DATA_RES_ECHO_GET,                                    //              None
            Float
    // Near End Echo [dB]
    RKMON_NE_ECHO_POWER,                                        //              None
            Float
    // Far End Echo [dB]
    RKMON_FE_ECHO_POWER,                                        //              None
            Float
    // Timing Drift [ppm]
    RKMON_TIMING_DRIFT,                                 //
None                    Float
    // Frequency Offset [Hz]
    RKMON_FREQ_OFFSET,                                  //
None                    Float
// ********* V90 Constants (K56FLEX, V90) **********
    // Robbed Bits Signaling
    RKMON_RBS_DETECTED          = V90_RK_CODES,  //             None
            DWORD       RBS frame 0 to 63    (1' indicate robbed bit)
    // PCM Pad
    RKMON_PAD_DETECTED,                                 //
None            DWORD       PAD 0=NORMAL, 3=3dBPad 6=6dBPad
    // High Pass filter enabled
    RKMON_HIGHPASS_FILTER_ENABLED,                      //              None
            BOOL - Yes/No
// ********* SpeakerPhone Constants **********
    // Speakerphone Mode (FD, HD, HS)
    RKMON_SPKP_MODE     = SPKP_RK_CODES,         //              None
            SPKPMode
    // State
    RKMON_STATE,                                        //
None                    SPKPState
    // Input-Output Mute
    RKMON_IO_MUTE,                                      //
SPKP_PROBE              BOOL - Yes/No
    RKMON_SATURATION,                           //
SPKP_PROBE              BOOL - Yes/No
    RKMON_DC_LEVEL,                                     //
SPKP_PROBE              FLOAT
    // Echo Cancellers
    RKMON_FILTER_LENGTH,                        //
SPKP_MODULE             INT - No of Taps
    RKMON_EC_OPERATE,                           //
SPKP_MODULE             BOOL - Yes/No
    RKMON_ADAPT_ENABLED,                        //
SPKP_MODULE             BOOL - Yes/No
    RKMON_EC_DELAY,                                     //
SPKP_MODULE             INT - No of Samples
    // AGC and Sw-Loss
    RKMON_AMP_ENABLED,                          //
SPKP_MODULE             BOOL - Yes/No
    // Powers
    RKMON_POWER,                                        //
SPKP_PROBE              FLOAT - Power [dB]
    RKMON_NOISE_POWER,                          //
SPKP_PROBE              FLOAT - Power [dB]
    // Gains
    RKMON_GAIN,                                         //
{SPKP_MODULE, GAIN_FORMAT}   INT/FLOAT - Gain [Scaled, dB, Linear]
    // Gain Estimations
    RKMON_ECHO_PATH_GAIN,                       //
ECHO_PATH               FLOAT - Gain [dB]
    RKMON_EC_GAIN,                                      //
SPKP_MODULE             FLOAT - Gain [dB]
    RKMON_RES_ECHO_GAIN,                        //
SPKP_MODULE             FLOAT - Gain [dB]
    RKMON_INIT_GAIN,
    RKMON_MAX_GAIN,
    RKMON_FULL_DUPLEX_MEASURE,
    RKMON_TONE_DETECT,
    RKMON_NOISE_INSERTION_LENGTH,
    RKMON_NOISE_INSERTION_ENABLE,
    RKMON_FADE_IN_LENGTH,
    RKMON_FADE_IN_ENABLE,
    RKMON_UPSTEP,
    RKMON_MIN_LINE_OUT_POWER,
    RKMON_DMP_MASK,
    RKMON_LINE_OUT_SILENCE_GAIN_REDUCTION,
```

APPENDIX B-continued

```
    RKMON_INITIAL_FULL_DUPLEX_MEASURE,
// ********* Voice Constants **********
    RKMON_VOICE_AVG_POWER = VOICE_RK_CODES,
} RK_MON_CODES;
// SPKP Modules
typedef enum {
    LINEIN_AMP,
    LEC,  TONE_DET,  RX_SD,  RX_SW_LOSS,  RX_AGC,
    SPKR_AMP,
    MIC_AMP,
    AEC,  TEX_SD,  TX_SW_LOSS,  TX_AGC,
    LINEOUT_AMP,
ALL_MODULES
} SPKP_MODULE;
// SPKP Probing points
typedef enum {
    LINEIN,
    LEC_IN,  LEC_OUT,  RX_AGC_OUT,
    SPKR,
    MIC,
    AEC_IN,  AEC_OUT,  TX_AGC_OUT,
    LINEOUT,
    ALL_PROBES
} SPKP_PROBE;
// Gain Format:   dB  or  Scaled 0-255
typedef enum { SCALED, DB, LINEAR } GAIN_FORMAT;
// Echo Path
typedef enum { ACOUSTIC, LINE } ECHO_PATH;
// Error Control Mode
typedef enum { EC_FORCED, EC_OFF, EC_ON } ERROR_CONTROL_MODE;
// Modem global state
typedef enum {   STATE_INITIALIZING, STATE_IDLE, STATE_ORIGINATE,
STATE_ANSWER,
                    STATE_V8BIS_HS,  /* STATE_MST, */ STATE_TRAINING,
STATE_CONNECTED,
                    STATE_ESCAPED, STATE_LAL, STATE_LAL_ESCAPED,
STATE_RDL} MODEM_STATE;
// Compression Mode
typedef enum { CMPRS_OFF, CMPRS_ON } COMPRESSION_MODE;
#endif        // _MODEM_CODES_H_
```

Appendix C

```
#include "dlldefs .h"
#include "ModemCtrl.h"
#include "appinterface.h"
#define MAX_ERRORMSG_LEN      200
HANDLE            hModCtrlVxd = NULL;
char              ErrorMsg [MAX_ERRORMSG_LEN];
HANDLE WINAPI ModemOpen( DWORD Code )
{
    PCLIENT_INFO      pClient;
    if ( hModCtrlVxd == NULL || hModCtrlVxd == INVALID_HANDLE_VALUE ) {
#ifndef WINDOWS_NT
        hModCtrlVxd = CreateFile( "\\\\.\\MODCTRL.VXD", 0, 0, NULL,
                                              0, FILE_FLAG_DELETE_ON_CLOSE,
NULL);
#else
        hModCtrlVxd = CreateFile ("\\\\.\\MODCTRL0",
                    GENERIC_READ | GENERIC_WRITE,
                    FILE_SHARE_READ,
                    NULL,
                    OPEN_EXISTING,
                    0,
                    NULL);
#endif
        if ( hModCtrlVxd == INVALID_HANDLE_VALUE ) {
            strncpy( ErrorMsg, "Failed to load MODCTRL.VXD",
                MAX ERRORMSG_LEN );
            return FALSE;
        }
    }
    unsigned long     nBytes;
    BOOL rc = DeviceIoControl( hModCtrlVxd,
```

-continued

Appendix C

```
                                          DP_OPEN_MODEM,
                                          &Code, sizeof(DWORD),
                                          &pClient,
sizeof(PCLIENT_INFO) ,
                                          &nBytes, NULL );
    if ( rc == 0 ) {
        strncpy( ErrorMsg, "DeviceIoControl with Code DP_OPEN_MODEM
Failed",
                            MAX_ERRORMSG_LEN );
        return NULL;
    }
    return (HANDLE)pClient;
}
BOOL WINAPI ModemClose( HANDLE hModem )
{
    if ( hModCtrlVxd == NULL ) {
        strncpy( ErrorMsg, "Can't close modem: ModCtrl.vxd not loaded",
                            MAX_ERRORMSG_LEN );
        return FALSE;
    }
    if ( hModem == NULL ) {
        strncpy( ErrorMsg, "Can't close modem: NULL handle",
                            MAX ERRORMSG_LEN );
        return FALSE;
    }
    unsigned long       nBytes;
    PCLIENT_INFO        pClient = (PCLIENT_INFO)hModem;
    BOOL rc = DeviceIoControl( hModCtrlVxd,
                                          DP_CLOSE_MODEM,
                                          &pClient,
sizeof (PCLIENT_INFO),
                                          NULL, 0
                                          &nBytes, NULL );
    if ( rc == 0 ) {
        strncpy( ErrorMsg, "DeviceIoControl with Code DP_CLOSE_MODEM
Failed",
                            MAX_ERRORMSG_LEN );
        return NULL;
    }
    return 1;
}
DWORD WINAPI ModemGetCodesVersion ( )
{
    return MODEM_CODES_VERSION;
}
BOOL WINAPI ModemConfigure(HANDLE hModem, DWORD dwConfigCode, PVOID
pInBuffer,
                            DWORD nInBufferSize, PVOID pOutBuffer, DWORD
nOutBufferSize,
                            PDWORD pBytesReturned )
{
    BOOL                    rc;
    MODEMCTRL_DATA          ModernCtrlData;
    PCLIENT_INFO            pClient = (PCLIENT_INFO)hModem;
    DWORD BytesReturned;
#ifdef WINDOWS_NT
    UPDATE_STRUCT           UpdateClient;
#endif
    if ( hModern == NULL ) {
        strncpy( ErrorMsg, "ModernConfigure failed: HANDLE is NULL",
MAX_ERRORMSG_LEN );
        return FALSE;
    }
#ifdef WINDOWS_NT
    rc = DeviceIoControl( hModCtrlVxd,
                                          DP_UPDATE_MODEM,
                                          &hModern, sizeof (DWORD),
                                          &UpdateClient, sizeof(UPDATE_STRUCT),
                                          &BytesReturned, NULL );
    if ( rc == FALSE )
    {
        return FALSE;
    }
    if (( UpdateClient.Status == DPACTIVE ) && (UpdateClient.ID ! =
RKID_WINAC)) {
#else
    if (( pClient -> Status == DPACTIVE ) && (pClient ->ID ! =
```

-continued

Appendix C

```
RKID_WINAC)) {
#endif
        // Can't configure an active modulation, unless it is WinAC.
        strncpy( ErrorMsg, "Modem is active", MAX_ERRORMSG_LEN );
        return FALSE;
    }
#ifdef WINDOWS_NT
    ModemCtrlData.ObjectID = UpdateClient. ID;
#else
    ModemCtrlData.ObjectID = pClient -> ID;
#endif
    ModemCtrlData.CodeIndex = dwConfigCode;
    ModemCtrlData.pInBuffer = pInBuffer;
    ModemCtrlData.cbInBuffer = nInBufferSize;
    ModemCtrlData.pOutBuffer = pOutBuffer;
    ModemCtrlData.cbOutBuffer = nOutBufferSize;
    ModemCtrlData.pBytesReturned = pBytesReturned;
    rc = DeviceIoControl( hModCtrlVxd,
                                                 DP_CONFIGURE_MODEM,
                                                 &ModemCtrlData,
sizeof(MODEMCTRL_DATA),
                                                 NULL, 0,
                                                 &BytesReturned, NULL );
    if ( rc == FALSE )
        strncpy( ErrorMsg, "DeviceIoControl with Code DP_CONFIGURE_MODEM
Failed",
                            MAX_ERRORMSG_LEN );
    return rc;
}
BOOL WINAPI ModemControl( HANDLE hModem, DWORD dwConfigCode, PVOID
pInBuffer,
                            DWORD nInBufferSize, PVOID pOutBuffer, DWORD
nOutBufferSize,
                            PDWORD pBytesReturned )
{
    BOOL                        rc;
    PCLIENT_INFO                pClient = (PCLIENT_INFO)hModem;
    DWORD BytesReturned;
#ifdef WINDOWS_NT
    UPDATE_STRUCT               UpdateClient;
#endif
    MODEMCTRL_DATA              ModemCtrlData;
    if ( pClient == NULL ) {
        strncpy( ErrorMsg, "ModemControl failed: HANDLE is NULL",
MAX_ERRORMSG_LEN );
        return FALSE;
    }
#ifdef WINDOWS_NT
    rc = DeviceIoControl( hModCtrlVxd,
                                                 DP_UPDATE_MODEM,
                                                 &hModem, sizeof(DWORD),
                                                 &UpdateClient, sizeof(UPDATE_STRUCT),
                                                 &BytesReturned, NULL );
    if ( rc == FALSE )
    {
        return FALSE;
    }
    if ( UpdateClient.Status != DPACTIVE ) {
#else
    if ( pClient ->Status != DPACTIVE ) }
#endif
        strncpy( ErrorMsg, "modem is not active", MAX_ERRORMSG_LEN );
        return FALSE;
    }
#ifdef WTNDOWS_NT
    ModemCtrlData.ObjectID = UpdateClient.ID;
#else
    ModemCtrlData.ObjectID = pClient ->ID;
#endif
    ModemCtrlData.CodeIndex = dwConfigCode;
    ModemCtrlData.pInBuffer = pInBuffer;
    ModemCtrlData.cbInBuffer = nInBufferSize;
    ModemCtrlData.pOutBuffer = pOutBuffer;
    ModemCtrlData.cbOutBuffer = nOutBufferSize;
```

-continued

Appendix C

```
    ModemCtrlData.pBytesReturned = pBytesReturned;
    rc = DeviceIoControl( hModCtrlVxd,
                                            DP_CONTROL_MODEM,
                                            &ModemCtrlData,
sizeof (MODEMCTRL_DATA),
                                            NULL, 0,
                                            &BytesReturned, NULL );
    if ( rc == FALSE )
        strncpy( ErrorMsg, "DeviceIoControl with Code DP_CONTROL_MODEM
Failed",
                            MAX_ERRORMSG_LEN );
    return rc;
}
BOOL WINAPI ModemMonitor( HANDLE hModem, DWORD dwConfigCode, PVOID
pInBuffer
                                DWORD nInBufferSize, PVOID pOutBuffer, DWORD
nOutBufferSize,
                                PDWORD pBytesReturned
{
    BOOL                            rc;
    PCLIENT_INFO                    pClient = (PCLIENT_INFO)hModem;
    MODEMCTRL_DATA                  ModemCtrlData;
    DWORD BytesReturned;
#ifdef WINDOWS_NT
    UPDATE_STRUCT                   UpdateClient;
#endif
    if ( pClient == NULL ) {
        strncpy( ErrorMsg, "ModemMonitor failed: HANDLE is NULL",
MAX_ERRORMSG_LEN );
        return FALSE;
    }
#ifdef WINDOWS_NT
    rc = DeviceIoControl( hModCtrlVxd,
                                            DP_UPDATE_MODEM,
                                            &hModem, sizeof (DWORD),
                                            &UpdateClient, sizeof(UPDATE STRUCT),
                                            &BytesReturned, NULL );
    if ( rc == FALSE )
    {
        return FALSE;
    }
    if ( UpdateClient.Status != DPACTIVE ) {
#else
    if ( pClient -> Status != DPACTIVE ) {
#endif
        //strncpy( ErrorMsg, "Modem is not active", MAX_ERRORMSG_LEN );
        return FALSE;
    }
#ifdef WINDOWS_NT
    ModemCtrlData.ObjectID = UpdateClient.ID;
#else
    ModemCtrlData.ObjectID = pClient -> ID;
#endif
    ModemCtrlData.CodeIndex = dwConfigCode;
    ModemCtrlData.pInBuffer = pInBuffer;
    ModemCtrlData.cbInBuffer = nInBufferSize;
    ModemCtrlData.pOutBuffer = pOutBuffer;
    ModemCtrlData.cbOutBuffer = nOutBufferSize;
    ModemCtrlData.pBytesReturned = pBytesReturned;
    rc = DeviceIoControl( hModCtrlVxd,
                                            DP_MONITOR_MODEM,
                                            &ModemCtrlData,
sizeof (MODEMCTRL_DATA),
                                            pOutBuffer, nOutBufferSize,
                                            pBytesReturned, NULL );
    if ( rc == FALSE )
        strncpy( ErrorMsg, "DeviceIoControl with Code DP_MONITOR_MODEM
Failed",
                            MAX_ERRORMSG_LEN );
    return rc;
}
VOID WINAPI ModemGetLastError( PCHAR pBuf, DWORD nBuf )
{
    strncpy( pBuf, ErrorMsg, nBuf );
}
```

What is claimed is:

1. A computer system comprising:
   a communication device;
   an operating system having a communication driver for communication with said communication device; and
   a diagnostics software including:
     a diagnostics driver;
     a diagnostics dynamic link library; and
     a diagnostics application programming interface;
   wherein said communication device is capable of communicating with a remote device via a communication line, and wherein said diagnostics software is capable of transmitting diagnostics information relating to said communication device to said remote device via said communication line and receiving control information from said remote device based on said diagnostics information for optimizing performance of said communication device over said communication line.

2. The computer system of claim 1, wherein said communication device is a communication software.

3. The computer system of claim 2, wherein said communication software is a software modem.

4. The computer system of claim 1, wherein said communication device is a hardware modem.

5. The computer system of claim 1, wherein said communication device multiplexes said diagnostics information with data being transmitted to said remote device.

6. The computer system of claim 5, wherein said communication device includes a datapump, and wherein said datapump multiplexes said diagnostics information with said data being transmitted to said remote device.

7. The computer system of claim 5, wherein said communication device multiplexes said diagnostics information with said data being transmitted to said remote device, as part of a data protocol.

8. The computer system of claim 7, wherein said data protocol is a V.42 protocol.

9. The computer system of claim 5, wherein said diagnostics information includes one or more internal parameters of said communication device.

10. The computer system of claim 1, wherein said communication device demultiplexes said control information from data being received from said remote device.

11. The computer system of claim 10, wherein said control information includes one or more control commands from said remote device.

12. The computer system of claim 11, wherein said one or more control commands modify one or more internal parameters of said communication device.

13. The computer system of claim 1, wherein said communication line includes a first communication channel and a second communication channel, and wherein data is communicated via said first channel and said diagnostics information is communicated via said second channel.

14. The computer system of claim 13, wherein said second channel is a control channel.

15. The computer system of claim 14, wherein said control channel is a V.34 control channel.

16. A diagnostics software for use in a computer system including a communication device and an operating system having a communication driver for communication with said communication device, said diagnostics software comprising:
   a diagnostics driver;
   a diagnostics dynamic link library; and
   a diagnostics application programming interface;
   wherein said communication device is capable of communicating with a remote device via a communication line, and wherein said diagnostics software is capable of transmitting diagnostics information relating to said communication device to said remote device via said communication line and receiving control information from said remote device based on said diagnostics information for optimizing performance of said communication device over said communication line.

17. The diagnostics software of claim 16, wherein said communication device is a communication software.

18. The diagnostics software of claim 17, wherein said communication software is a software modem.

19. The diagnostics software of claim 16, wherein said communication device is a hardware modem.

20. The diagnostics software of claim 16, wherein said communication device multiplexes said diagnostics information with data being transmitted to said remote device.

21. The diagnostics software of claim 20, wherein said communication device includes a datapump, and wherein said datapump multiplexes said diagnostics information with said data being transmitted to said remote device.

22. The diagnostics software of claims 20, wherein said communication device multiplexes said diagnostics information with said data being transmitted to said remote device, as part of a data protocol.

23. The diagnostics software of claim 22, wherein said data protocol is a V.42 protocol.

24. The diagnostics software of claim 20, wherein said diagnostics information includes one or more internal parameters of said communication device.

25. The diagnostics software of claim 16, wherein said communication device demultiplexes said control information from data being received from said remote device.

26. The diagnostics software of claim 25, wherein said control information includes one or more control commands from said remote device.

27. The diagnostics software of claim 26, wherein said one or more control commands modify one or more internal parameters of said communication device.

28. The diagnostics software of claim 16, wherein said communication line includes a first communication channel and a second communication channel, and wherein data is communicated via said first channel and said diagnostics information is communicated via said second channel.

29. The diagnostics software of claim 28, wherein said second channel is a control channel.

30. The diagnostics software of claim 29, wherein said control channel is a V.34 control channel.

31. A communication software for use in a computer system including an operating system having a communication driver for communication with said communication software, said communication software comprising:
   a port driver for communication with said communication driver;
   a controller module;
   a datapump module;
   a hardware interface for interfacing with a communication line; and
   a diagnostics module;
   wherein said communication software is capable of communicating with a remote device via said communication line, and wherein said diagnostics module is capable of transmitting diagnostics information relating to said communication device to said remote device via said communication line and receiving control information from said remote device based on said diagnostics information for optimizing performance of said communication device over said communication line.

32. The communication software of claim 31, wherein said communication software is a software modem.

33. The communication software of claim 31, wherein said communication software multiplexes said diagnostics information with data being transmitted to said remote device.

34. The communication software of claim 33, wherein said datapump module multiplexes said diagnostics information with said data being transmitted to said remote device.

35. The communication software of claim 33, wherein said controller module multiplexes said diagnostics information with said data being transmitted to said remote device, as part of a data protocol.

36. The communication software of claim 35, wherein said data protocol is a V.42 protocol.

37. The communication software of claim 33, wherein said diagnostics information includes one or more internal parameters of said communication software.

38. The communication software of claim 37, wherein said diagnostics information includes one or more internal parameters of said datapump module.

39. The communication software of claim 31, wherein said communication software demultiplexes said control information from data being received from said remote device.

40. The communication software of claim 39, wherein said control information includes one or more control commands from said remote device.

41. The communication software of claim 40, wherein said one or more control commands modify one or more internal parameters of said communication software.

42. The communication software of claim 41, wherein said one or more control commands modify one or more internal parameters of said datapump module.

43. The communication software of claim 31, wherein said communication line includes a first communication channel and a second communication channel, and wherein data is communicated via said first channel and said diagnostics information is communicated via said second channel.

44. The communication software of claim 43, wherein said second channel is a control channel.

45. The communication software of claim 44, wherein said control channel is a V.34 control channel.

46. A communication method using a computer system having a local communication device, a communication driver and a diagnostics software, said method comprising the steps of:

establishing a connection between said local communication device and a remote communication device;

controlling said local communication device using a communication application software in communication with said communication driver;

monitoring said communication device using said diagnostics software to obtain diagnostics information;

transmitting said diagnostics information to said remote communication device, via said connection, using said diagnostics software; and receiving control information from said remote communication device based on said diagnostics information for optimizing performance of said local communication device over said connection.

47. The communication method of claim 46, wherein said local communication device includes one or more communication parameters, and wherein said transmitting step includes transmitting at least one of said communication parameters.

48. The communication method of claim 46, wherein at least a part of said connection is established via a telephone line.

49. The communication method of claim 46, wherein at least a part of said connection is established via a peer-to-peer network.

50. The communication method of claim 46, wherein at least a part of said connection is established via the Internet.

51. The communication method of claim 46, wherein said communication device is a modem.

52. The communication method of claim 51, wherein said modem is a software modem.

* * * * *